United States Patent [19]

Morris

[11] 4,172,036
[45] Oct. 23, 1979

[54] FLOATING OIL SKIMMER

[76] Inventor: David E. Morris, 116 Mountain Highway, North Vancouver, British Columbia, Canada, V7J 2K3

[21] Appl. No.: 860,698

[22] Filed: Dec. 15, 1977

Related U.S. Application Data

[63] Continuation-in-part of Ser. No. 773,079, Feb. 28, 1977, abandoned.

[30] Foreign Application Priority Data

Jan. 12, 1977 [CA] Canada .................................. 269606

[51] Int. Cl.² .............................................. E02B 15/04
[52] U.S. Cl. ........................ 210/242 S; 210/DIG. 26
[58] Field of Search ................. 210/242 S, 400–402, 210/396, DIG. 25, DIG. 26

[56] References Cited

U.S. PATENT DOCUMENTS

| | | | |
|---|---|---|---|
| 3,358,838 | 12/1967 | Kosar et al. | 210/242 S |
| 3,642,140 | 2/1972 | Parker | 210/242 |
| 3,685,653 | 8/1972 | Van Stevern et al. | 210/242 S |
| 3,688,337 | 9/1972 | Noda | 210/402 X |
| 3,688,909 | 9/1972 | Titus et al. | 210/242 S |
| 3,722,689 | 3/1973 | Markel et al. | 210/242 S |
| 3,830,370 | 8/1974 | Glaeser et al. | 210/DIG. 25 |
| 3,905,902 | 9/1975 | Hoegberg et al. | 210/242 S |
| 4,021,344 | 5/1977 | Webb | 210/DIG. 26 |

Primary Examiner—Theodore A. Granger
Attorney, Agent, or Firm—Smyth, Pavitt, Siegemund, Jones & Martella

[57] ABSTRACT

An apparatus for removing oil floating on the water comprising: floats for floating the apparatus on the water; at least one set of rotatable discs comprising a plurality of spaced apart, generally parallel, vertically oriented discs having generally collinear centers. The sets of discs are mounted on the floats so that the discs are partly submerged when the apparatus is floating on the water.

9 Claims, 5 Drawing Figures

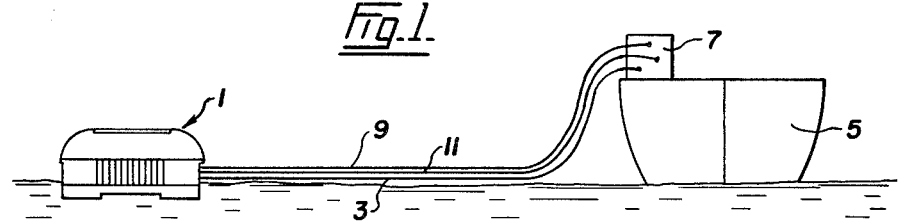
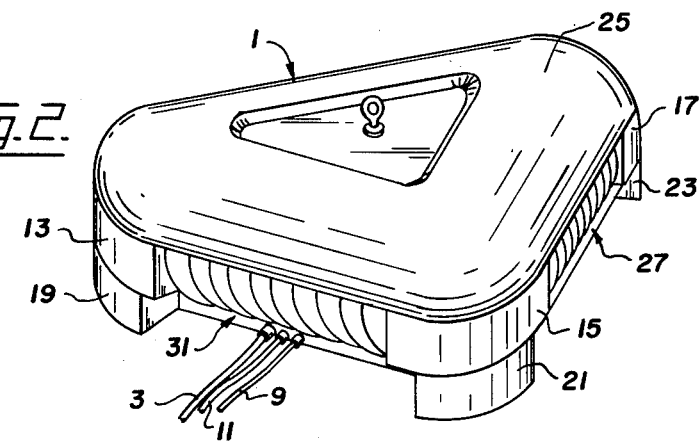
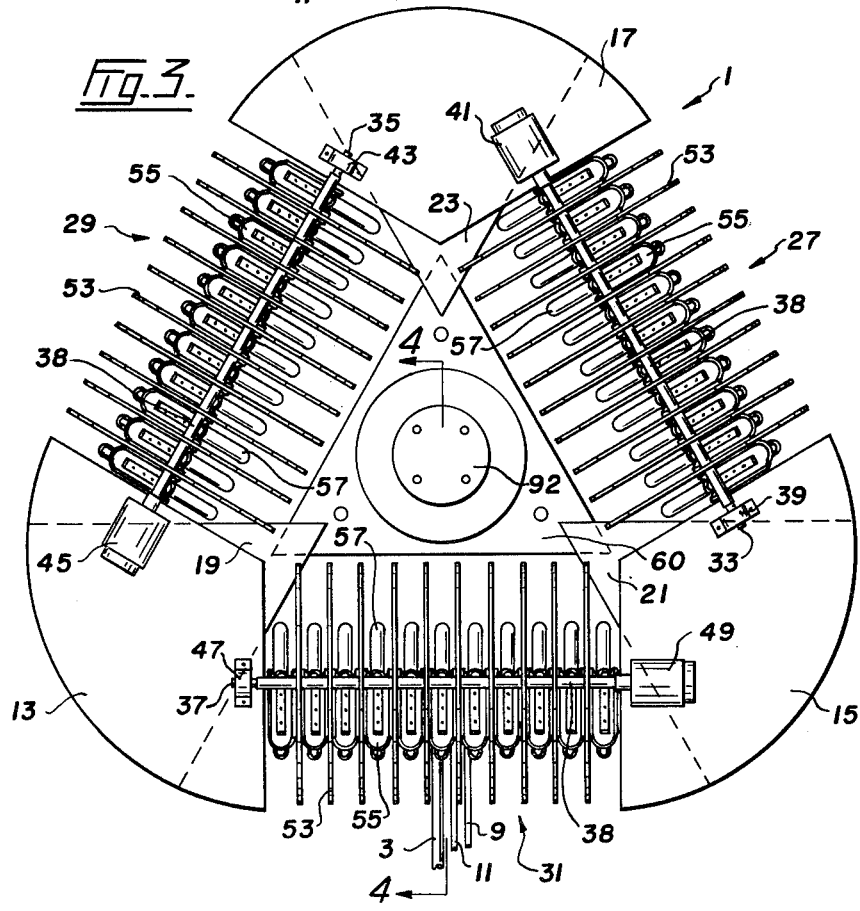

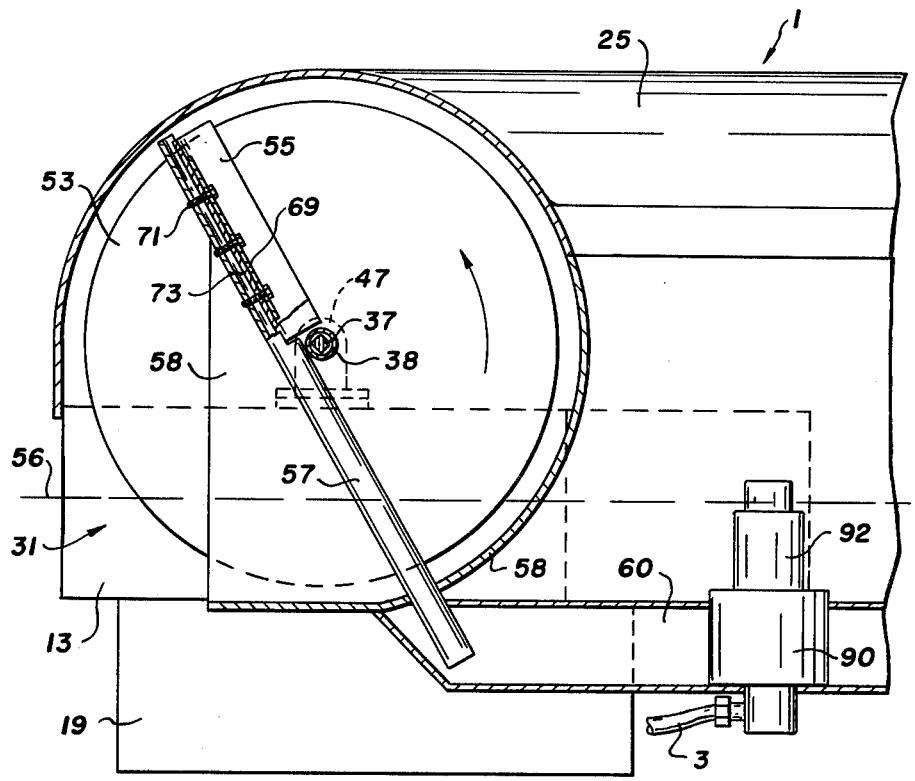
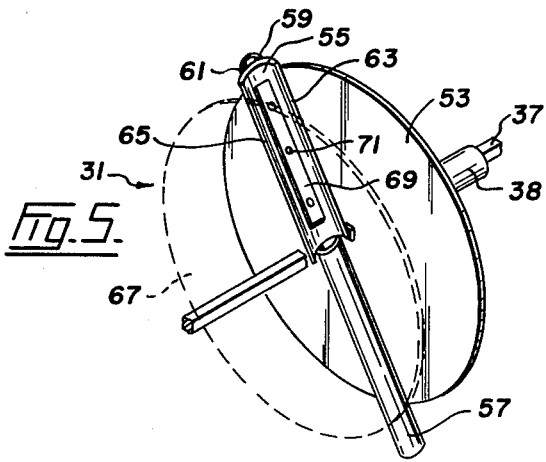

FLOATING OIL SKIMMER

RELATED APPLICATION

This application is a continuation-in-part of my earlier U.S. application 773,079 filed Feb. 28, 1977, now abandoned.

BACKGROUND OF THE INVENTION

The problem of oil spills on water is of increasing concern to the public today and this concern is reflected by legislated sanctions against concerns so spoiling the environment and by public outcries and bad publicity attached to such spillages of oil. Consequently, there is a considerable demand for an easily transportable, relatively inexpensive and effective means for removing oil spilled into a body of water.

One solution to this problem is proposed, for example, in U.S. Pat. No. 4,021,344 to Webb. Webb proposes a relatively compact floating apparatus containing a plurality of semi-submerged rotating discs. The rotating discs pick up oil from the water and scrappers are provided to remove oil from the discs and transfer the oil through channels. In order to always present a number of discs in the direction of a layer of oil floating on the water, a circular shape for the apparatus was chosen with the discs oriented in a radial direction thereabouts. To drive the discs, teeth are provided on the periphery of the discs engaging with a central worm gear ring. In practice it has been found that the gear teeth on the periphery of the disc rapidly break off during operation of the apparatus, quickly debilitating it. Additionally, the drive means just described is relatively complex, expensive, and subject to fouling by debris floating on the water.

SUMMARY OF THE INVENTION

According to this invention, there is provided an apparatus for removing oil floating on the water comprising: buoyant means for floating the apparatus on the water; at least one set of rotatable discs comprising a plurality of spaced apart, generally parallel, vertically oriented discs having generally collinear centers, each disc having an outer edge, the sets of disc being mounted on the buoyant means so that the discs are partly submerged when the apparatus is floating on the water; drive means for rotating the discs so oil floating on the water adheres to the discs and is moved away from the water surface as the discs rotate; and means for removing the oil adhering to the discs and directing the oil to a storage location.

Preferably, the apparatus has three sides and three corners, one set of discs being mounted along each side in a triangular arrangement.

The buoyant means may comprise an upper buoyant means and a lower buoyant means, the upper buoyant means having a greater buoyancy than the lower buoyant means, the buoyancy of the upper and lower buoyant means being adjusted so that the lower buoyant means is generally submerged, and the upper buoyant means is generally exposed, when the apparatus is placed in the water, and the apparatus thereby floats near a regulated level.

Preferably, the upper buoyant means comprises an upper float adjacent each corner of the apparatus and the lower buoyant means comprises a lower float at each corner of the apparatus under the upper float.

The means for removing the oil may comprise a plurality of wiper blades for wiping each side of the discs and a conduit system for carrying the oil away from the blades.

In a preferred form, the wiper blades are of flat resilient material, with a front surface and a back surface, and are positioned between adjacent discs. Each blade has two scraping edges, one scraping edge for each adjacent disc, and extending from near the center of the discs to near the edge of the discs. The edges apply pressure to the discs and remove oil from the discs as the disc rotate. The edges are at an acute angle with the vertical in the direction of rotation of the adjacent discs. The blades are connected to the apparatus by connecting means generally along a center line of each blade parallel to the scraping edges, projections to each side of the center line applying pressure to the back surface of the blades to form a laterally concave front surface on the blades. The connecting means is adjustable to vary the pressure on the back surface of the blades and thereby to adjust the pressure between the scraping edges and the discs.

As will be described, the present invention overcomes difficulties associated with the prior art devices and provides improvement thereon.

In drawings which illustrates embodiments of the invention:

FIG. 1 is a side elevational view of an oil skimmer according to an embodiment of the invention together with a remote hydraulic power pack and an oil storage location;

FIG. 2 is an enlarged isometric view of an oil skimmer, according to an embodiment of the invention, with a protective cover in place;

FIG. 3 is a plan view of the apparatus shown in FIG. 2 with the protective cover removed;

FIG. 4 is an enlarged sectional view taken along section 4—4 of FIG. 3;

FIG. 5 is an enlarged isometric view of a portion of the apparatus shown in FIGS. 1 to 4 illustrating a wiper blade and conduit for removing the oil as located between adjacent discs.

DESCRIPTION OF THE PREFERRED EMBODIMENTS

FIG. 1 is a side elevational view showing an apparatus 1 for removing oil floating on water. As may be seen, the apparatus 1 is buoyant and floats on the water. Flexible conduit 3 is connected between the apparatus 1 and the platform 5 for moving oil therebetween. A hydraulic power pack 7, containing a power hydraulic pump powered by suitable means such as a diesel engine, is remotely located on the platform 5 and is connected to the apparatus 1 by means of hydraulic lines 9 and 11 for providing power to hydraulic motors of the apparatus 1.

As seen in better detail in FIG. 2, the apparatus 1 is generally triangular in shape with three sides and three corners. Buoyant means for floating the apparatus on the water consists of upper floats 13, 15 and 17, and lower floats 19, 21, and 23. As may be seen, the upper floats are each located at one corner of the apparatus 1. The lower floats are located at each corner of the apparatus under the corresponding upper floats and are smaller, and consequently less buoyant, than the upper floats. FIG. 2 illustrates the apparatus 1 as covered with a triangular protective cover 25. FIG. 3 is a plan view of the apparatus 1 with the cover 25 removed. From FIG. 3, it may be appreciated that the upper floats 13, 15 and 17, as well as the lower floats 19, 21 and 23, consist of wedge-shaped sealed tanks.

The buoyancy of the apparatus is adjusted so that the lower floats are submerged and the upper floats partly submerged. When the weight of the apparatus 1 is increased by taking on oil, as will be explained later, the greater buoyancy of the upper floats 13, 15 and 17 prevents the level of floating from changing significantly. In fact, it has been found in practice that the floating level varies only approximately one inch depending on whether the apparatus 1 is empty or fully loaded with oil. This does away with the necessity for complicated float level regulating devices. Additionally, because of the triangular shape of the apparatus 1 with the floats located at the corners of the triangle, the floats are located further from the center of gravity of the apparatus than, for example, in a circular apparatus and this imparts a greater floating stability to the apparatus 1.

As best seen in FIG. 3, the apparatus 1 includes three sets of rotating discs 27, 29 and 31. The discs of each set are spaced apart, generally parallel, and vertically oriented with collinear centers. For example, the centers of the discs in set 27 are located along linear drive shaft 33. Sets of discs 29 and 31 have corresponding drive shafts 35 and 37. As seen best in FIG. 4 and 5, the drive shafts are square in section and pass through corresponding square apertures in the discs. The discs are spaced apart by small sections of tubing 38, the sections at the ends of the sets of discs being fixed to the shaft by set screws. Drive shaft 33 is provided with a journal bearing and bearing block 39 at one end and a hydraulic motor 41 at the other end. Similarly, set of discs 29 is provided with journal bearing and bearing block 43 and hydraulic motor 45 and set of discs 31 is provided with journal bearing and bearing block 47 and hydraulic motor 49. Although the use of other suitable disc materials, such as stainless steel, is possible, the discs in the preferred embodiments are made of polyvinyl chloride. It has been found that the oil adhering qualities of the discs is improved by sanding the sides of the discs with 600 grit sand paper.

Referring to FIG. 4, which shows one of the discs 53 of the set of discs 31, it may be seen that the discs are partly submerged when the apparatus is floating in the water with the bottom part of the discs below the water level 56. As indicated by the arrow, the discs in the preferred embodiments rotate outwardly at the top and inwardly at the bottom towards the apparatus. Consequently, oil picked up the discs from the water surface adheres to the discs and is carried upwards away from the water. When the oil adhering to disc 53 reaches wiper blade 55, it is directed into conduit pipe 57 and flows downwardly towards the inwardly located sump 60 of the apparatus 1. Inwardly and upwardly curving guards 58 redirect water and oil dropping off the discs into the body of water.

The wiper blade 55 may be seen in better detail in FIG. 5. The wiper blade 55 is illustrated adjacent disc 53. The conduit pipes 57 consists of pipes extending upwardly between the adjacent discs and outwardly from the center of apparatus 1. Referring to FIG. 4, a triangular sheet metal support 58 is provided for conduit pipe 57. The top half of the conduit pipe 57 from the drive shaft 37 to the outer edge of the disc 53 is cut away leaving a bottom half section of pipe. The remaining section of pipe between the drive shaft 37 and the outer edge of the disc provides outwardly directed edges 59 and 61 upon which wiper blade 55 rests. Wiper blade 55 is of a flat resilient material, such as high density polyurethane, and has a scraping edge 63 for disc 53 and a scraping edge 65 for the adjacent disc 67 shown in dotted lines. A stainless steel strip 69 is provided on top of the resilient portion of wiper blade 55 along the cut away portion of the conduit pipe 57. Three bolts 71 passing through apertures in the stainless steel strip 69 and the wiper blade 55, are threadedly received in corresponding apertures in the cut away portion of conduit pipe 57. This is best seen in FIG. 4. The bolts 71 provide means for connecting wiper blade 55 to pipe 57. A space 73 exists between wiper blade 55 and conduit pipe 57. The space 73 exists because the wiper blade 55 is less upwardly concave than the cut away section of conduit pipe 57. By tightening the bolts 71, the space 73 is reduced and the concaveness of wiper blade 55 increased. The tightening of bolts 71 consequently reduces the pressure of edges 63 and 65 of wiper blade 55 on discs 53 and 67 respectively. By loosening the bolts 71 the pressure is correspondingly increased. Consequently, the bolts 71 provide means for adjustably varying the pressure between the wiper blades and the disc. As may be appreciated from FIGS. 4 and 5, the oil collecting on wiper blade 55 drains downwards through the conduit pipe 57 to the sump 60 located upwardly of the apparatus 1. From FIG. 3, it may be appreciated that the wiper blade 55 is typical of corresponding wiper blades, with corresponding conduit pipes 57, located between the adjacent discs of each of the set of disc 27, 29 and 31. As the sets of discs are rotated by the hydraulic motors, the oil drains down the conduits into the inwardly located sump 60. From FIGS. 3 and 4, it may be seen that sump 60 is provided with sump 90 powered by a hydraulic motor 92. The oil collecting in sump 60 is pumped through flexible conduit 3, as seen in FIG. 1, to a storage location on the platform 5.

It may also be appreciated that the hydraulic motor 92 of the pump 90, as well as hydraulic motors 41, 45 and 49 for the sets of discs, are all powered by hydraulic fluid provided through hydraulic fluids lines 9 and 11 from hydraulic power packs 7. In smaller embodiments of the invention, where weight is a factor, the hydraulic motors may be replaced by electric motors receiving power through cables from platform 5.

In the present embodiment, structure components, such as cover 25, the upper and lower floats, sump 60, and guards 58 are constructed of fibreglass reinforced plastic. Other materials, such as light aluminum sheet, could be used.

The embodiments illustrated are triangular in shape. Four-sided or multi-sided forms are possible but would be heavier, more complex and less compact than the triangular form and therefore less preferred. In some embodiments, it might be considered advantageous to employ only a single set of rotating discs with collinear centres.

What I claim is:

1. An apparatus, with at least three generally straight sides, for removing oil floating on water, the apparatus comprising:

buoyant means for floating the apparatus on water;
at least three sets of rotatable discs arranged along the sides of the apparatus and comprising a plurality of spaced apart, generally parallel, vertically oriented discs having generally collinear centers, each disc having an outer edge, the discs of each set being mounted on a common drive shaft means aligned with the centers of the discs, the sets of discs being mounted on the buoyant means so that the discs are partly submerged when the apparatus is floating on the water;

a motor connected directly to each drive shaft for rotating the discs so oil floating on the water adheres to the discs and is moved away from the water surface as the discs rotate;

a stationary wiper assembly associated with each set of discs and including a plurality of wiper blades for wiping each side of the discs, the wiper blades being of flat resilient material, with a front surface and a back surface, and positioned between adjacent discs, each blade having two scraping edges, one edge scraping each adjacent disc, and extending from near the center of the discs to near the edge of the discs, the edges applying pressure to the discs and removing oil from the discs as the discs rotate, the edges being at an acute angle with the vertical in the direction of rotation of the adjacent discs, the blades being connected to the apparatus by connecting means generally along a center line of each blade parallel to the scraping edges, projections to each side of the center line applying pressure to the back surface of the blades to form a laterally concave front surface on the blades, the connecting means being adjustable to vary the pressure on the back surface of the blades and thereby to adjust the pressure between the scraping edges and the discs;

centrally located oil storage means; and conduit means to convey oil to the oil storage means, said conduit means including pipes extending generally upwardly between adjacent discs, each pipe having a section cut away towards the wiper blades and extending generally from the center of the discs of a set to the edge of the discs, the cut away sections providing edges generally parallel to the center line of the wiper blades and to each side of the center line of the wiper blades, the edges comprising said projections, the connecting means being bolts passing through apertures in the blades and connected to the pipes at the cut away sections by means of threaded apertures in the pipes, the pressure of the scraping edges being adjusted by rotating the bolts in the threaded apertures.

2. An apparatus as claimed in claim 1, the apparatus comprising at least three corners, each corner being between two sides, the buoyant means comprising an upper buoyant means near each corner and a lower buoyant means near each corner, the upper buoyant means having a greater buoyancy than the lower buoyant means, the buoyancy of the upper and the lower buoyant means being adjusted so that the lower buoyant means are generally submerged, and the upper buoyant means are generally exposed, when the apparatus is placed in the water, and the apparatus thereby floats near a regulated level.

3. An apparatus as claimed in claim 1, having three sides and three corners, one set of discs being mounted along each side in a triangular arrangement.

4. An apparatus as claimed in claim 3, the upper buoyant means comprising an upper float adjacent each corner of the apparatus and the lower buoyant means comprising a lower float at each corner of the apparatus under the upper floats.

5. An apparatus as claimed in claim 4, the floats being generally wedged-shaped.

6. An apparatus as claimed in claim 1, including oil storage means.

7. An apparatus as claimed in claim 6, including a pump for pumping oil from the storage means to a storage location away from the apparatus.

8. An apparatus as claimed in claim 6, the oil storage means comprising a container located centrally of the apparatus.

9. An apparatus as claimed in claim 1, wherein said motor is a hydraulic motor, and further comprising a hydraulic pump located remotely from the apparatus and hydraulic lines connecting said hydraulic pump with said hydraulic motor, said hydraulic pump providing pressurized hydraulic fluid for powering said hydraulic motor.

* * * * *